Sept. 30, 1941. J. R. BALSLEY Re. 21,907

LIGHT CONTROL MEANS

Original Filed July 10, 1940

INVENTOR.
James R. Balsley
BY
Darby + Darby

Reissued Sept. 30, 1941

Re. 21,907

UNITED STATES PATENT OFFICE 21,907

LIGHT CONTROL MEANS

James R. Balsley, Stamford, Conn., assignor, by direct and mesne assignments, to James B Balsley, Incorporated, Stamford, Conn., a corporation of Connecticut Original No. 2,242,638, dated May 20, 1941, Serial No. 344,706, July 10, 1940. Application for reissue August 7, 1941, Serial No. 405,840

11 Claims. (Cl. 250—41.5)

Figure 1:
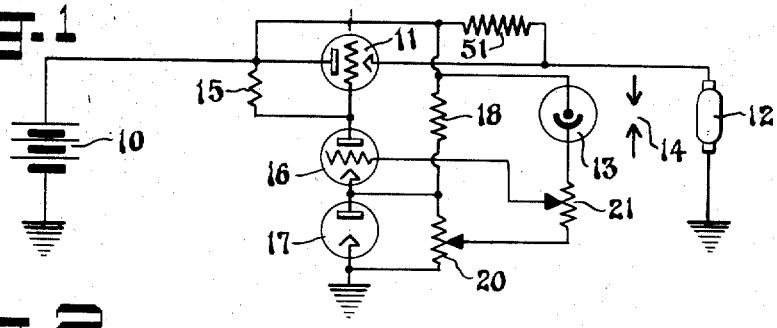

The present invention relates to means for controlling and stabilizing electrically energized light sources. Particularly the invention relates to means for stabilizing such light sources through the use of what may be termed "optical feedback." In numerous instances, such as photoengraving, printing of photographic film and the like, it is necessary that a light source of uniform intensity be utilized. While many attempts have been made to achieve this aim through the regulation of the supply voltage, such attempts have not been successful since they do not compensate for variations in light intensity resulting from usage of the equipment. For example, when an incandescent lamp is the light source no maintenance of the voltage at a constant value can compensate for the deterioration of the filament or blackening of the glass by depositing of the filament material thereon which occurs as a natural result of the use of the lamp. Further, in instances in which lamps of the mercury vapor type are used, the maintenance of the supply voltage at a constant value is entirely inadequate. Light intensity is a function of power which is the product of voltage and current. The ratio of current to voltage is a function of the gas pressure which is, in turn, a function of temperature. As an example, a particular lamp may take 0.4 ampere at 250 volts under certain conditions, and, by subjecting the burner to a blast of cold air, be made to dissipate the same amount of energy with a current of 0.8 ampere at 125 volts. It is obvious that, if the voltage is maintained at a constant value, the intensity will change with changes in temperature.

Moreover, lamps of the low pressure mercury vapor type have not been suitable to uses which involve modulation of the lamp, such, for example, as sound-on-film recording and light signalling, due to the fact that the random vaporization and condensation of mercury particles in the arc create variations in light intensity of such magnitude and frequency that they interfere seriously with the recording or signalling.

The present invention, on the other hand, supplies the light source with its energizing current through the medium of an electron discharge tube, the lamp in turn being caused to shine upon a photoelectric cell which is in a circuit such that the output of the cell is fed back to the electron discharge tube and controls the gain of that tube. By this means the intensity of the light itself controls the operation of the circuit so that the intensity is maintained constant or is modulated in exact accordance with the signal to be converted into light.

An object of the invention is to provide a light source which will be of uniform intensity in the presence of conditions which would normally tend to change the intensity at rates varying between zero and many thousands of cycles per second.

A further object of the invention is to provide such uniform intensity light through the medium of a system in which the light source itself controls the supply of energy thereto.

It is a further object of the invention to provide a means whereby a light source may be modulated without bringing about disturbances which alter the intensity of the light in accordance with factors other than the modulation.

Figure 2:
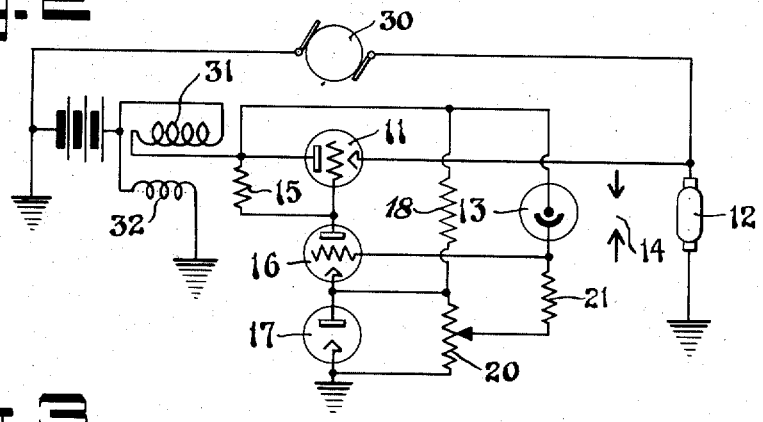
Figure 3:
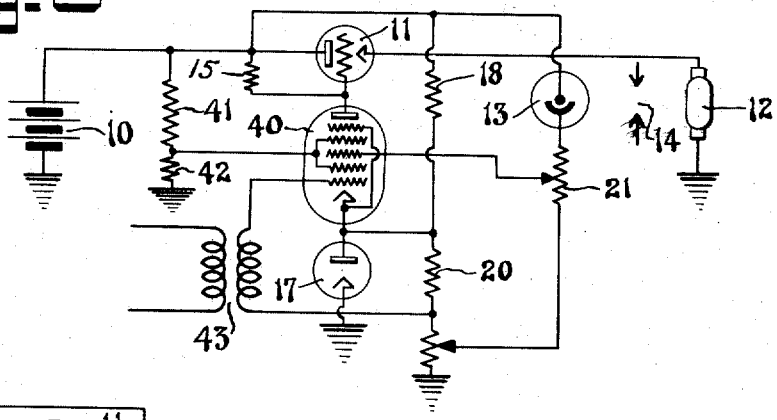
Figure 4:
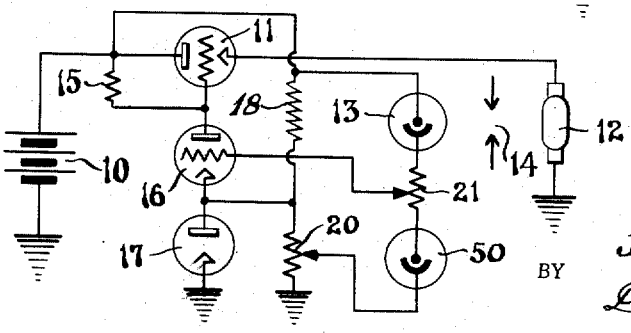

Other objects and features of the invention will be set forth in connection with the following description when considered in connection with the appended drawing, in which Figure 1 is a diagram of a circuit for maintaining constant intensity of a light source;

Figure 2 is a diagram of a circuit similar to that of Figure 1, in which, however, only a portion of the current to the light source is supplied through an electron discharge tube, the greater portion being supplied by a generator;

Figure 3 is a diagram of the circuit illustrating the modulation of a light source in such a manner that its intensity is varied in accordance with the modulation only without the interposing of any foreign disturbances; and Figure 4 is a diagram of the application of the circuit of Figure 1 to the problem of copying photographs, documents, and the like, making an exact copy as regards density and contrast or any desired variation of either or both irrespective of the latent contrast of the copy paper or film being used.

Referring to Figure 1, there is at 10 a battery or other current source which supplies plate current to an electron discharge tube 11, which tube is in the circuit of a light source 12. Placed near the light source 12 is a photoelectric cell 13 and between the two is a shutter 14, by means of which the amount of light falling on the photoelectric cell from light source 12 may be adjusted.

The plate and grid of tube 11 are connected by resistance 15, through which voltage amplifier tube 16 receives its plate excitation from current source 10. Connected in the cathode circuit of tube 16 is a voltage regulator tube 17, the purpose of which is to make the potential of the cathode of tube 16 positive with respect to the negative terminal of current source 10 and to make this potential substantially independent of the cathode current of tube 16. In order to keep the variation in current through tube 17 as small as possible, it is supplied with additional current through resistance 18. Shunting the tube 17 is a resistance 20, having an adjustable tap which is connected through a resistance 21, or a portion thereof, to the grid of tube 16, and also through resistance 21 to the photoelectric cell 13. Resistance 20 is large as compared with the resistance of tube 17 and small as compared with resistance 21, which latter is the principal load resistance for photoelectric cell 13. Resistance 51 may be used to supply a steady current to light source 12 by shunting tube 11 for a purpose to be described later.

The circuit above described is a two-stage amplifier of the so-called D. C. type, driven by a photo-electric cell and consisting of one voltage amplifier stage and one power stage with the lamp 12 as load for the power stage.

In operation, the light intensity is adjusted by regulating the grid voltage of tube 16. This may be effected in either of two ways or by a combination thereof. One of the two ways of adjusting is by regulating the amount of light reaching cell 13, as for example by regulating the aperture in diaphragm or shutter 14. The other mode of adjusting is by regulating the position of the adjustable taps on resistances 20 and 21.

It will be seen that if the light intensity tends to increase, current from photoelectric cell 13 will increase and will cause an increased flow of current through the resistance 21 and consequently cause the grid of tube 16 to become more positive. This in turn will cause an increased flow of current through tube 16 and an increased flow of current through resistance 15, thus causing the grid of tube 11 to become more negative, thereby reducing the energizing current for lamp 12. Of course, in a similar manner, if the light intensity tends to decrease, the resulting increase of the energizing current for lamp 12 will compensate for this tendency.

As an illustration of the practical advantage of the invention and the manner in which it operates, an experiment utilizing a G. E. type H3 mercury mercury vapor lamp will be described. This lamp, which draws 0.4 ampere at 250 volts after it has reached thermal equilibrium, was utilized as the light source. After the lamp had reached thermal equilibrium and was operating under its normal conditions, the shutter 14, which had been closed, was suddenly opened, thereby adjusting the light intensity to a new and lower value. The intensity decreased instantly, the voltage on the tube rising rapidly to approximately 255 volts and the current dropping to 0.1 ampere. During the ensuing several minutes, while the lamp was reaching its new point of thermal equilibrium, the voltage slowly dropped to approximately 125 and the current slowly rose to approximately 0.2 ampere, with absolutely no change in intensity during the entire period. In other words, the control means of this invention automatically supplied the needed current to maintain uniform intensity as the voltage across the lamp varied as a function of the slowly changing internal temperature and pressure.

It will be obvious that since air currents on a lamp of this type create large changes in temperature and consequent changes in pressure, such a compensation as described above is of great practical value.

It has further been found that when such mercury vapor lamps are used in the conventional manner the intensity may be reduced to about thirty per cent of its normal value by reducing the voltage across the lamp. When the voltage is reduced further, the arc breaks and the light is extinguished.

By the means disclosed, the intensity may be reduced to less than one per cent of its normal intensity either slowly or periodically and the arc is found to be entirely stable.

For uses where the disturbances which tend to alter the intensity represent depths of modulation which are appreciably less than one hundred per cent, that portion of the current which will be considered as the "steady" current may be supplied by a battery, by a resistance shunting tube 11 as shown in Figure 1, or by a generator. The portion of current required to compensate for disturbances may be supplied through an electron discharge tube as previously described. Figure 2 shows a circuit utilizing a generator for the purpose mentioned, and also for performing another function, that of compensating automatically for slow variations in intensity even of great amplitude as will be described later. As an illustration of the operation of this circuit, particular values are assumed.

The lamp 12 draws 1.2 amperes at 840 volts. When operated on direct current it is discovered that it is subject to high frequency variations amounting to thirty per cent maximum modulation. The modulation current is then 0.3 times 1.2 amperes, or 0.36 ampere.

A generator represented as having armature 30 and field windings 31 and 32 will supply the lamp with 0.84 ampere at 840 volts. Field winding 31 is wound to operate in the plate circuit of tube 11 to take 0.36 ampere normally. It is so connected that as the current through it increases the output voltage of the generator is reduced.

Circuit components 10, 11, 12, 13, and 16 function exactly as described above for all light variations which occur at frequencies higher than a few per second.

For slow changes they have an additional function, that of altering the output of the generator through automatic variations of the field strength. This action will take place at frequencies up to a limit which is determined by the characteristics of the generator itself.

This type of circuit has practical application for such operations as the printing of motion picture film where it is imperative that the average value of light intensity be kept constant and where rapid variations of intensity of as little as a few per cent may ruin the print. It may also be utilized to compensate for variations in intensity normal for any carbon arc.

In Figure 3 there is shown a circuit which is generally similar to that of Figure 1, the circuit of Figure 3 being particularly designed, however, to permit of modulation of a light source. Like parts in Figure 3 have been given the same reference characters as in Figure 1 for the purpose of convenience. In connection with Figure 3, it may be stated that this arrangement permits the use of a mercury vapor lamp, which has not heretofore been possible. In the past, low pressure gas discharge tubes have been utilized for modulation purposes, as for example for recording sound on film, but these tubes were not satisfactory due to insufficient light intensity and non-linear characteristics. When mercury was added to such lamps or used alone, the intensity was increased to the desired value but other difficulties arose. Used in this manner, non-uniform characteristics were produced which were difficult or impossible to compensate. The response was deficient in high frequencies, distortion was high, and, in addition, the average intensity could not be controlled within sufficiently close limits to meet modern requirements. Incandescent lamps have likewise been utilized for the purposes of recording and other uses involving modulation but were unsatisfactory since the thermal inertia of the filaments was too great for practical usage at high frequencies.

Recent developments of the high pressure mercury vapor lamp have reduced the noise level of such a lamp to a point where such lamps may be used as exciter lamps for purposes of sound recording. For these purposes, however, external modulating means have been employed since no practical means have been discovered for modulating the arc itself.

In making photographic sound records it is customary to focus the light source on a narrow slit and to focus the image of the slit on the film. Unless the light source, lenses, cell, and all other parts of the system are very firmly fixed, vibration occurs which creates a variation in light intensity on the film which is eventually reproduced as so-called microphonic noise. The same result obtains if the filament of an incandescent lamp vibrates or the arc in a gas discharge tube does not remain in constant position. All of the above are disadvantages which are extremely difficult to overcome by mechanical means. If a circuit such as that of Figure 3 is utilized and means provided to illuminate the photoelectric cell 13 from a point between the last of the disturbing elements and the film, all disturbances, whether arising from the lamp itself or from any of the elements between the lamp and the film, will be compensated for.

In the circuit of Figure 3, current is supplied from the source 10 to the electron discharge tube 11 in the same manner as described in connection with Figure 1. In the plate circuit of the electron discharge tube 11 is placed a light source 12, between which and the photoelectric cell 13 a shutter 14 is interposed. The simple three-element tube 16 of Figure 1 is replaced in the circuit of Figure 3, for the purpose of circuit simplification, by a multi-element tube 40, containing two control grids. The plate of this tube is connected in the circuit in the same manner as the plate of tube 16 of Figure 1. Tube 40 has a screen grid which is connected to a point between resistances 41 and 42, which resistances shunt the tube 11 and its load. One of the control grids of the tube 40 is adjustably connected to resistance 21, which is identical with the resistance 21 of Figure 1. The second control grid of tube 40 is connected to the secondary of a transformer 43, the primary of which is the modulation input circuit.

Other elements of the circuit, such as 17 and 18, are identical with the corresponding elements of Figure 1. Examination of this circuit will show that it likewise provides a negative or inverse optical feedback from the load of tube 11, that is, from lamp 12 to the input. In brief, a fractional part of the output voltage here designated as $\beta$ is fed back to the input of the amplifier. Black, in Patent No. 2,102,671, has shown that with an amplifier having a gain of $\mu$, when $\mu\beta$ is large as compared with unity, the relation of output voltage to the input voltage is proportional to $$\frac{1}{-\beta}$$

and is independent of all other factors. In the case illustrated, the light intensity is proportional to $$\frac{1}{-\beta}$$

since the feedback voltage, that is, the voltage developed across resistance 21, is a function of the light intensity. It, therefore, follows that the light intensity will be proportional to the modulation voltage at all frequencies where the requirements of feedback and gain are met, and that the light intensity will be independent of all other factors, such as supply voltage changes, ageing of the lamp, mercury sputtering, etc.

Figure 3 illustrates only one of the many circuits which may be employed utilizing the advantages of optical feedback for such purposes as sound recording, signalling, and television. It will be obvious that electrical inverse feedback means alone, while effective for correcting defects within the amplifier, are entirely ineffective for corrections external to that amplifier and that the means of Figure 3 corrects not only for defects arising within the amplifier but also for defects arising between the point in the system where the feedback voltage is applied and the point where the useful work is done by the beam of light.

Figure 4 is a diagram of a circuit which may be used for facsimile reproduction. In this case, it is assumed that a document which has faded or yellowed is to be copied and that the copy is to be substantially black and white. Further, it is assumed that the copy is to be made on an inexpensive diazo type paper, which paper is sensitive to ultraviolet light only and that the document to be copied will not reflect the ultraviolet light to which the paper is sensitive. In order to solve the problem assumed above, the circuit of Figure 1 is slightly modified by placing therein a second photoelectric cell 50, which cell is between the resistance 21 and the resistance 20.

In operating this circuit for purposes as described, the document to be copied is scanned by well-known means by a spot of light which will be reflected from the scanned surface onto the photoelectric cell 50. Light from the tube 12 is used to scan the surface of the light-sensitive diazo paper.

In the circuit as shown in Figure 4, cell 13, cell 50 and resistance 21 together determine the grid bias of tube 16 and consequently the light intensity of lamp 12. Light from the lamp 12 is caused to fall on cell 13 in the same manner as described with reference to Figure 1. The first operating step is to determine the extreme values of intensity of light from lamp 12 which will be required to produce the desired ratio of dark to light areas on the copy.

These two values may be designated as $I_1$ and $I_2$. With light reflected from the darkest area of the original onto cell 50, adjustments will be made to obtain intensity $I_2$ by the means described above, that is, by means of adjustment of resistance 21 and of shutter 14. With light reflected from the lightest areas of the original on the cell 50 the gain of the amplifier will be adjusted by well-known means to change the intensity of light from the value $I_2$ to value $I_1$. With these adjustments made, a copy may be produced which will have any desired contrast. It is obvious that by altering connections the copy may be either a positive or negative copy of the original.

Optical feedback of the type described above in connection with the drawing may be employed effectively for projection type television receivers since, as has been described, the light intensity may be made directly proportional to the modulating voltage. Means previously devised, such as the water cell of Scophony, have been used to modulate high intensity light sources for television purposes but these means are very inefficient and do not permit the undistorted passage of ultraviolet light. With the present devices and circuits, the ultraviolet radiation of mercury vapor arcs may be utilized in conjunction with a fluorescent screen and thereby desirable image retention may be obtained.

In addition to the uses already mentioned, this method of optical feedback is advantageous in light signalling devices whether the signals are to be recorded or to be merely converted to sound for audible reproduction such as for conversing between ships at sea.

From the above description it will be apparent to those skilled in the art that the invention herein disclosed may be embodied in other psysical structures without departing from the novel subject matter thereof. I do not, therefore, desire to be limited to the disclosure as given for purposes of illustration but rather to the scope of the claims granted me.

What is claimed is:

1. The method of controlling the light intensity of a light source conductively connected in the output circuit of an electron discharge tube by means of inverse optical feedback which comprises regulating the current through said tube by means of a photoelectric device wherein the output of said tube is proportional to illumination of said device at all frequencies, and causing a portion of the light from said light source to fall upon said device so that the power supplied to said light source is inversely proportional to illumination of said device for any fixed value of illumination or variation thereof.

2. The method of controlling the light intensity of a light source conductively connected in the output circuit of a direct current amplifier by means of inverse optical feedback, which comprises regulating the output of said amplifier by means of a photoelectric device wherein the output of said amplifier is proportional to illumination of said device at all frequencies, and causing a portion of the light from said light source to fall upon said device so that the power supplied to said light source is inversely proportional to illumination of said device for any fixed value of illumination or variation thereof.

3. The method of controlling light intensity of a light source by means of inverse optical feedback, which comprises energizing said light source by means of electrical current supplied over a plurality of paths, one of said paths being an electron discharge tube which has in its input circuit a photoelectric device wherein the tube output is inversely proportional to illumination of said device at all frequencies, the current through said tube being a portion of the energizing current of said light source, and causing a portion of the light from said light source to fall upon said device so that the power supplied to said light source is inversely proportional to illumination of said device for any fixed value of illumination or variation thereof.

4. A device for controlling the light intensity of a light source, comprising an electron discharge tube, a light source conductively connected in the output circuit of said tube, and a photoelectric device for receiving light from said light source and degeneratively connected to the input of said tube in order that the power supplied to said light source be inversely proportional to illumination of said device for any fixed value of illumination or variation thereof at all frequencies.

5. A device for controlling the light intensity of a light source, comprising a direct current amplifier, a light source conductively connected in the output circuit of said amplifier, a photoelectric device receiving light from said light source and degeneratively connected to the input of said amplifier wherein the power supplied to said light source is inversely proportional to illumination of said device for any fixed value of said illumination or variation thereof at all frequencies.

6. A device for controlling the light intensity of a light source, comprising an electron discharge tube, a generator, a light source energized jointly by said generator and by current through said electron discharge tube, a connection from a field winding of said generator to said tube, a photoelectric device positioned to receive light from said light source and connected to the input of said tube wherein the power supplied to the light source is inversely proportional to illumination of said device for any fixed value of illumination or variation thereof.

7. A device for copying and facsimile reproduction, comprising an electron discharge tube, a current source, a light source energized with current through said tube, a light sensitive device positioned to receive light from said light source wherein the power supplied to said light source is inversely proportional to any fixed value of illumination of said device or variation thereof at all frequencies, a second light sensitive device positioned to receive light from a document to be copied and connected to the input of said tube to cause the power supplied to said light source to be proportional to illumination of said second device for any fixed value of illumination or variation thereof at all frequencies.

8. The method of modulating the light from a light source and simultaneously controlling the average intensity thereof, which comprises regulating the output of an electron discharge tube having a signal input circuit, by a photoelectric device wherein the tube output is inversely proportional to illumination of said device at all frequencies, energizing said light source with current through said tube, and causing a portion of the light from said light source to fall upon said device so that the power supplied to said light source is inversely proportional to illumination of said device for any fixed value of illumination or variation thereof.

9. In a system for simultaneously controlling the average intensity and depth of modulation of a light source, a direct current amplifier having an input section and an output section, means for supplying a modulation voltage to said input section, a photoelectric device degeneratively connected to said amplifier in order that the output of said amplifier be inversely proportional to illumination of said device for any fixed value of illumination or variation thereof, means for energizing said source with current through the output stage of said amplifier, said device being positioned to receive light from said light source.

10. The method of maintaining at constant intensity a mercury vapor lamp conductively connected in the output circuit of an electron discharge tube, which comprises impressing a portion of the light from said lamp upon a photoelectric device, and impressing the output voltage of said device upon the input of said tube in inverse phase, whereby all components of the output of said device control the intensity of said lamp at all frequencies.

11. Means for controlling the light intensity of a mercury vapor lamp comprising an electron discharge tube, a mercury lamp conductively connected in the output circuit of said tube, a photoelectric device positioned to receive light from said lamp and degeneratively connected to said tube in order that the output of said tube be proportional to the illumination of said device at all frequencies, whereby the intensity of said lamp is maintained constant.

JAMES R. BALSLEY.